United States Patent [19]

Mizumoto et al.

[11] Patent Number: 5,351,226

[45] Date of Patent: Sep. 27, 1994

[54] METHOD AND APPARATUS FOR REPRODUCING INFORMATION FROM A RECORDABLE OPTICAL DISC REGARDLESS OF WHETHER AN INDEX AREA IS DETECTED AS BEING PRESENT ON THE DISK AND A METHOD OF GENERATING INDEX INFORMATION DURING REPRODUCTION OF THE INFORMATION ON THE DISK

[75] Inventors: Katsuji Mizumoto; Mutsumi Kono, both of Tokorozawa, Japan

[73] Assignee: Pioneer Electronic Corporation, Tokyo, Japan

[21] Appl. No.: 908,160

[22] Filed: Jul. 2, 1992

[30] Foreign Application Priority Data

Aug. 1, 1991 [JP] Japan .................. 3-193218
Aug. 1, 1991 [JP] Japan .................. 3-193219

[51] Int. Cl.⁵ .................. G11B 5/09; G11B 7/00
[52] U.S. Cl. .................. 369/47; 369/58; 369/54; 369/32
[58] Field of Search .......... 369/47, 48, 49, 18, 369/32, 58, 54

[56] References Cited

U.S. PATENT DOCUMENTS 4,835,631 5/1989 Miyake et al. .......... 369/43 X
5,177,720 1/1993 Kondo .................. 369/32

FOREIGN PATENT DOCUMENTS 2148488 6/1990 Japan .

OTHER PUBLICATIONS

Patent Abstracts of Japan vol. 14, No. 398 (P-1097) Aug. 28, 1990, & JP-A-02 148 488 (Kenwood Corp) Jun. 7, 1990.
European Search Report Application No. EP 92 30 6232 dated Mar. 31, 1993.

*Primary Examiner*—Aristotelis Psitos
*Assistant Examiner*—Dunian Wilkinson
*Attorney, Agent, or Firm*—Kane, Dalsimer, Sullivan, Kurucz, Levy, Eisele and Richard

[57] ABSTRACT

An apparatus for reproducing information from a recordable optical disc having an information recording area for recording a plurality of information pieces and an index information recording area for recording index information with respect to the plurality of information pieces. The apparatus includes a driving device for rotationally driving the optical disc, a pickup device for irradiating a light beam onto the optical disc so as to read information recorded on the optical disc, a transferring device for transferring the pickup device in a radial direction of the optical disc, a memory for storing a temporary index information, and a control device for controlling the driving device, the pickup device and the transferring device and for producing the temporary index information on the basis of a read information read by the pickup device. The control device produces and stores the temporary index information into the memory when no index information is recorded on the index information recording area. Accordingly, desired information can be reproduced from the program area of a partial disc.

11 Claims, 11 Drawing Sheets

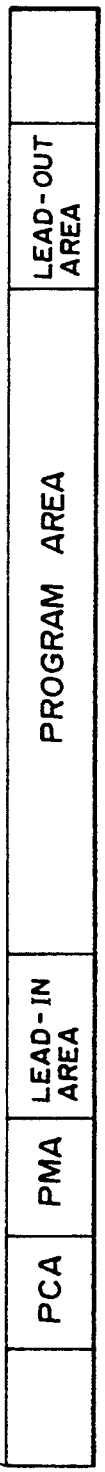
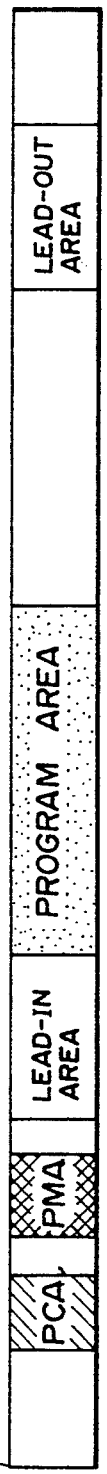
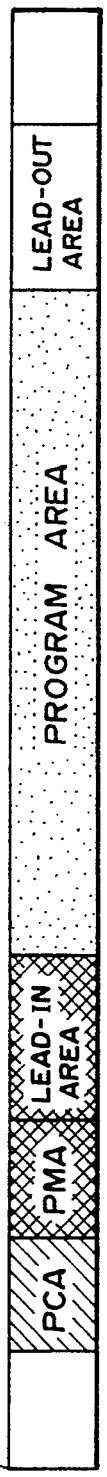
F I G. 4A    F I G. 4B    F I G. 4C

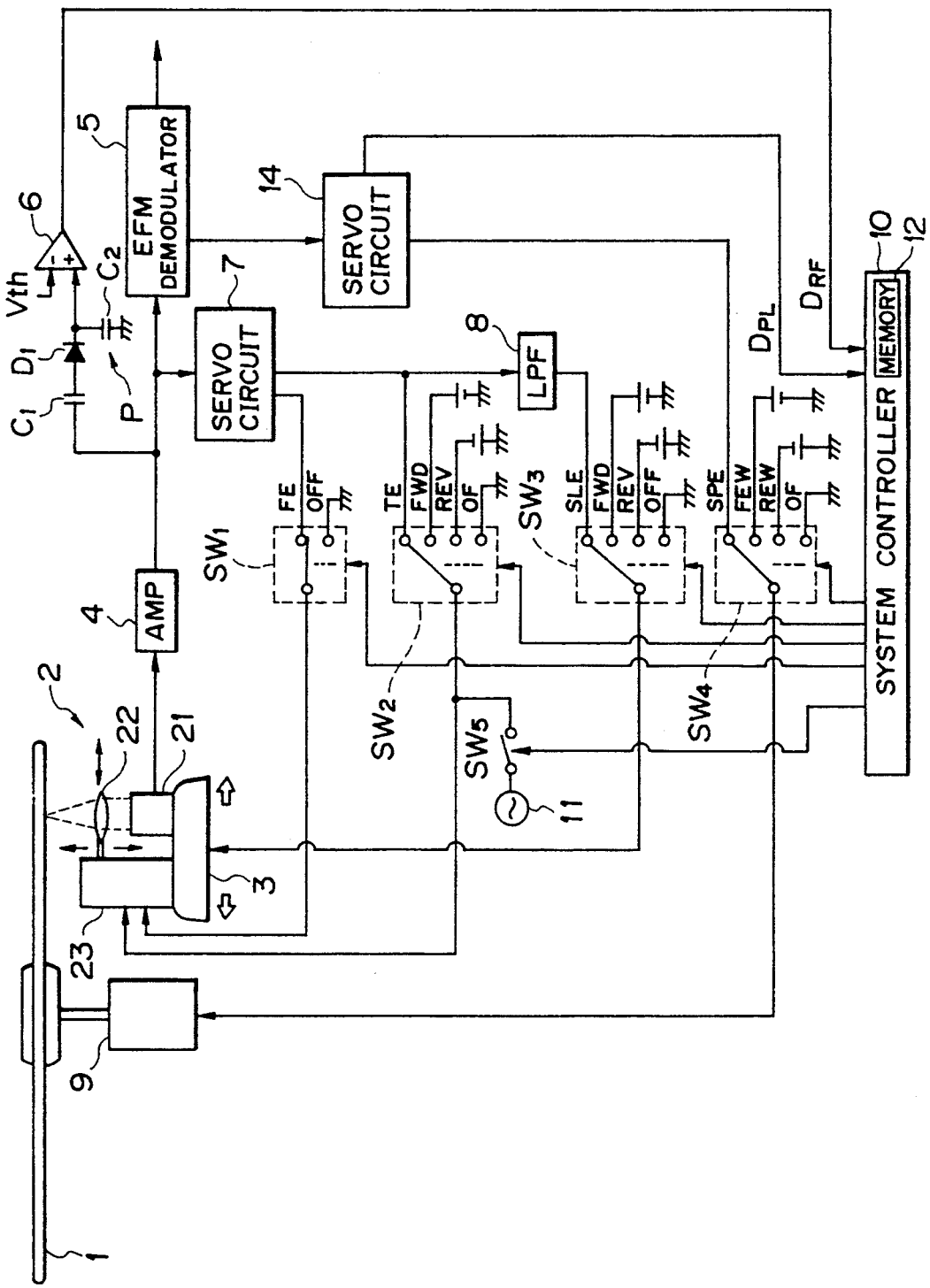

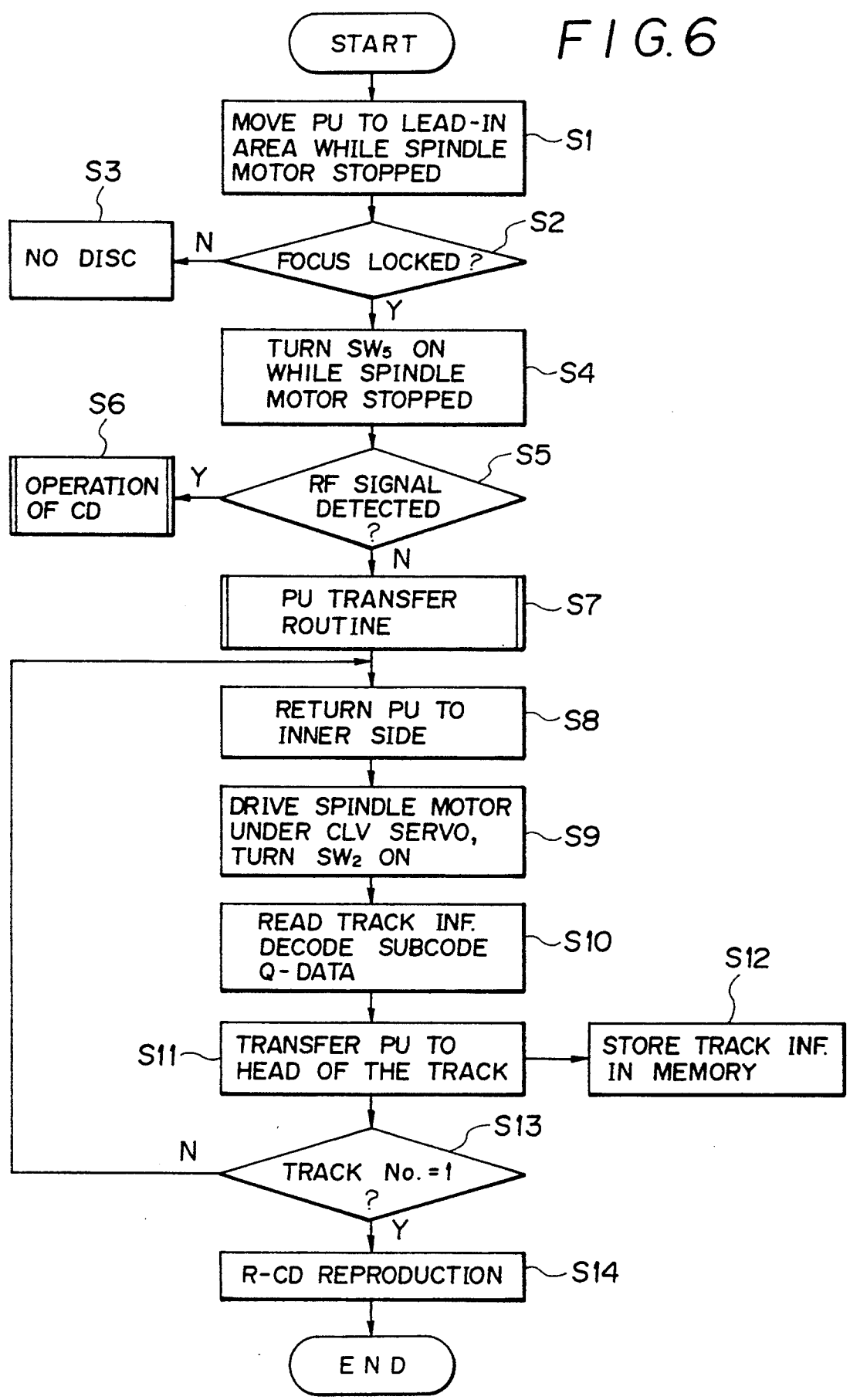

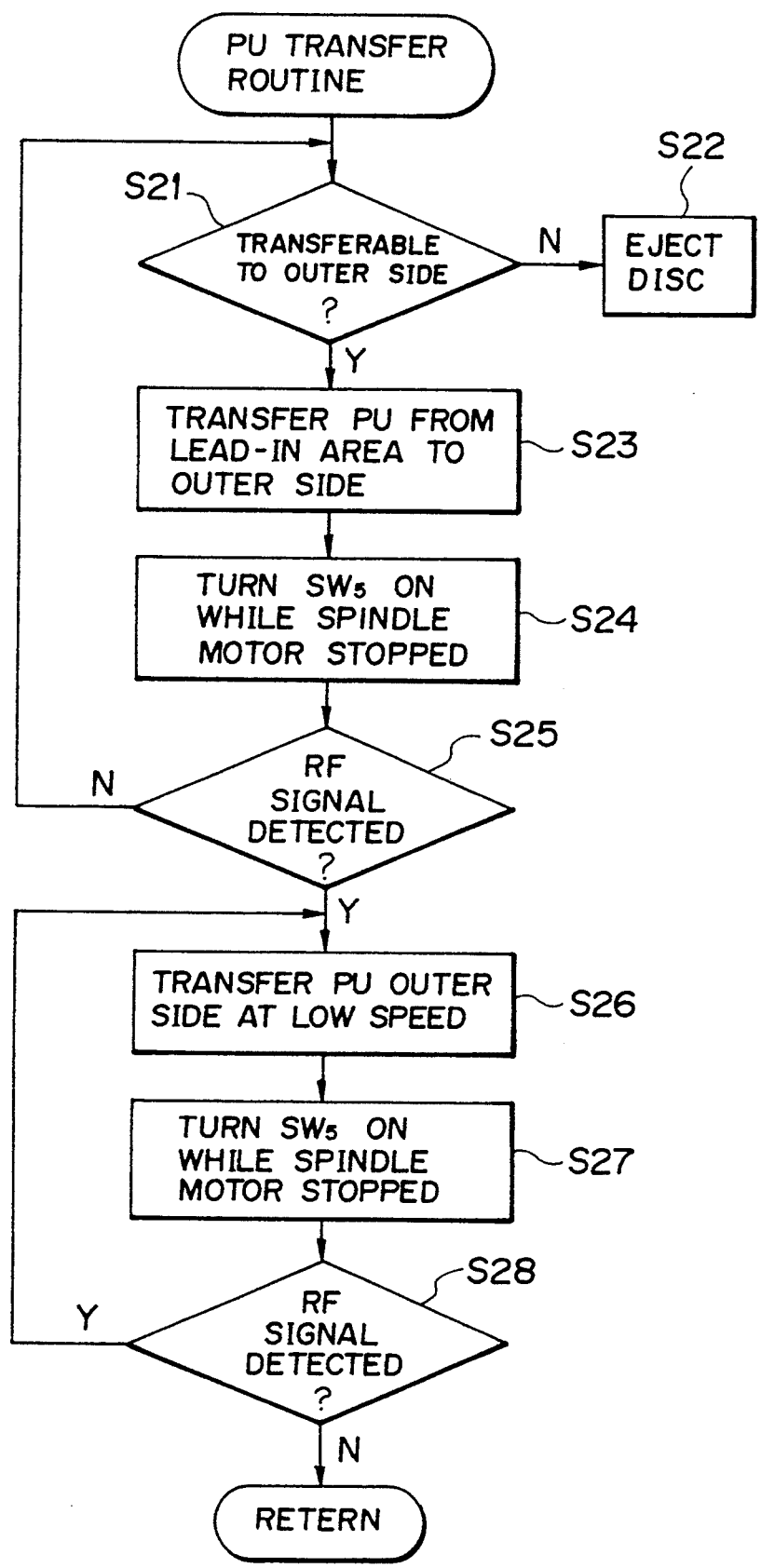

METHOD AND APPARATUS FOR REPRODUCING INFORMATION FROM A RECORDABLE OPTICAL DISC REGARDLESS OF WHETHER AN INDEX AREA IS DETECTED AS BEING PRESENT ON THE DISK AND A METHOD OF GENERATING INDEX INFORMATION DURING REPRODUCTION OF THE INFORMATION ON THE DISK

BACKGROUND OF THE INVENTION

This invention relates to an apparatus for and a method of reproducing information from a recordable optical disc on which information is partially recorded.

An optical disc, so-called compact disc (CD), has a diameter of 12 cm (approximately 4.72 inches) or 8 cm (approximately 3.12 inches). On a compact disc, as shown in FIG. 1, a lead-in area, a program area and a lead-out area are formed in turn from an inner circumference of the disc. Signal recorded onto the disc is an EFM (Eight to Fourteen Modulation) digital signal including main codes which are main information such as music information, and sub-codes such as time codes (Q-data) indicating time information. In the EFM signal, clock signal used for a spindle servo control is included. In the spindle servo control, the clock signal is compared with a reference synchronizing signal to produce a difference signal which is fed back to a spindle motor through an error amplifier, etc. and used for a rotational frequency control of the spindle motor.

On the lead-in area, an index information called TOC (Table of Contents) is recorded. The TOC includes, as sub-codes, information showing a total number of music pieces recorded on the program area and a total play time thereof are recorded. On the program area, the Q-data, a track number (TNO) indicating the number of music piece, relative play times (P-TIME) from the head of each track and a total play time (A-TIME) from a first track are recorded as sub-codes, in addition to music information recorded as main code. Further, lead-out codes indicating the lead-out area is recorded on the lead-out area.

The CD having the above recording format is a medium exclusively used for reproduction. Recently, it is known a recordable compact disc (R-CD) having the almost same recording format as the CD and on which information is additionally recordable. Though the recording format of the R-CD, generally called as "Orange Book", is in conformity with that of the CD, a Power Calibration Area (PCA) and a Power Memory Area (PMA) are further formed inner circumferential side of the lead-in area for convenience' sake of recording operation, as shown in FIG. 2 and 3.

On the recording tracks of the R-CD, guide grooves are formed which is wobbled at a frequency obtained by frequency-modulating a 22.05 KHz carrier by data showing absolute time information (ATIP: Absolute Time In Pregroove). A laser beam for recording information onto the disc is traced along the guide grooves under the tracking servo control. Further, the rotational frequency of the spindle motor controlled in such a manner that the center frequency of the wobbling becomes equal to 22.05 KHz. In this way, the tracking servo control and the spindle servo control for a disc on which no information is recorded (hereinafter referred to as "virgin disc") can be performed.

ATIP information has data of 42-bits per one frame which consists of a four-bit sync pattern (SYNC), three subsequent pieces of 8-bits data each indicating minute (MIN), second (SEC) and frame (FRAME) and a 14-bits error correction code (ECC).

Absolute time information indicated by ATIP information represents one second by 75 frames, same as the Q-data sub-code.

In addition to absolute time information, ATIP information contains coded special information, which is represented by a combination of three beginning one-bits (MSBs) of the data pieces respectively showing the "minute", "second" and "frame" (the fifth, thirteenth and twenty-first bits from the beginning of the frame). Particularly, when the combination of the fifth, thirteenth and twenty-first bits shows "1", "0" and "1", three bits consisting of the sixth to eighth bits show a recommended recording powder level (light intensity) for the disc. That is, eight recommended recording power levels, which are stepwise distributed, are defined in accordance with eight combinations of the sixth to eigth bits, namely, "000" to "111". The recommended recording power levels are defined for a condition that the wavelength of the recording beam equal to 780 nm, and the temperature T is equal to 25°. However, in actuality, the optimum recording power level (light intensity) is not always equal to the recommended recording power level because the wavelength depends on the temperature and the real numerical aperture NA of an objective lens deviates from the designed value.

The PCA is an area on which test recording for an optimum laser power adjustment is carried out before an actual recording on the program area. The PCA consists of a count area and a test area each having a plurality of sub-areas. On each of the sub-areas of the count area, predetermined EFM signals are recorded under one-to-one correspondence to each corresponding sub-areas of the test area. On each of the sub-areas of the test area, the test recording are carried out, before the actual recording to the program area, so as to determine an optimum recording power of the recording laser. These areas are provided because the recommended recording power level is not always coincident with the optimum recording power level, as described above. In the test recording, one sub-area is used for one test recording and the sub-area once used for test recording becomes no longer recordable. Therefore, in the case of next test recording, it is necessary to search and find an un-recorded sub-area positioned inner circumferential side of the used sub-area. The count area is provided so as to easily find the un-recorded sub-area. That is, when a certain sub-area of the test area is used for the test recording, a predetermined EFM signal is recorded onto the corresponding sub-area of the count area. Accordingly, an unrecorded sub-area of the test area can be find out by searching and finding an unrecorded sub-area the count area.

The PMA is an area used for successively storing a history of the recording information on the program area. More concretely, the beginning and end addresses of each track number recorded on the program area, etc., are recorded in the PMA in the same recording format as the TOC information recorded on the lead-in area.

With respect to a partially recorded R-CD (hereinafter referred to as "partial disc"), TOC information cannot be recorded in the lead-in area until an end of recording finally instructed by a user since there is the possibility that information is subsequently written in the remaining program area. Therefore, it is necessary to provisional record information of respective tracks already recorded. This is why the PMA area is provided with the R-CD. On the other hand, when a recording end instruction signifying that no more information will be recorded is given by a user, TOC information and the lead out code are recorded, respectively.

Since the R-CD on which recording is finally completed (hereinafter referred to as "finalized disc") has a format in conformity with that of a compact disc, it can be reproduced as well as a compact disc by a compact disc player exclusive for reproduction which does not comprise the ATIP decoder, etc.

FIG. 4A shows an information recording condition of the virgin disc, FIG. 4B shows an information recording condition of the partial disc and FIG. 4C shows an information recording condition of the finalized disc.

However, if the partial disc is tried to be reproduced by the conventional CD player, no EFM signal is obtained the lead-in area thereof because no information has been recorded in the lead-in area of the partial disc. Therefore, the rotation of the spindle motor may become irregular and out of control of the spindle servo. In such a case, it is conceivable to perform the spindle servo control by way of detecting the wobbling frequency of the guide grooves on the partial disc. However, it is difficult because conventional CD players are not provided with means for detecting the wobbling frequency. Further, some types of the conventional players have such a construction that the pickup can not be moved to the position of the PMA, i.e., inner circumferential position of the lead-in area.

SUMMARY OF THE INVENTION

It is an object of the present invention to provide apparatus for and methods of reproducing a partial R-CD, effectively using functions of a conventional CD player exclusive for reproduction.

According to one aspect of the present invention, there is provided an apparatus for reproducing information from a recordable optical disc having an information recording area for recording a plurality of information pieces and an index information recording area for recording index information with respect to the plurality of information pieces. The apparatus includes a driving device for rotationally driving the optical disc, a pickup device for irradiating a light beam onto the optical disc so as to read information recorded on the optical disc, a transferring device for transferring the pickup device in a radial direction of the optical disc, a memory for storing a temporary index information, and a control device for controlling the driving device, the pickup device and the transferring device and for producing the temporary index information the basis of an read information read by the pickup device. The control device produces and stores the temporary index information into the memory when no index information is recorded on the index information recording area.

According to another aspect of the present invention, there is provided a method of reproducing information, by irradiating a light beam emitted from an optical pickup, from a recordable optical disc having an information recording area for recording a plurality of information pieces and an index information recording area for recording index information with respect to the plurality information pieces, the method including the steps of; discriminating whether the index information is recorded in the index information recording area or not; detecting information piece recorded most outer position in the index information recording area and transferring the optical pickup to a position of the information of the information piece when it is discriminated that no index information is recorded in the index information recording area in the discriminating step; starting rotation of the optical disc, reading out the information piece by the optical pickup, and producing and storing a temporary index information from the read information; transferring the optical pickup to a position of next information piece in accordance with the stored temporary index information, reading out the information piece, and producing and storing temporary index information from the read information, and repeating the transferring step until temporary index information corresponding to all of the information pieces are produced and stored.

According to still another aspect of the present invention, there is provided a method of reproducing information, by irradiating a light beam emitted from an optical pickup, from a recordable optical disc having an information recording area for recording a plurality of information pieces and an index information recording area for recording index information with respect to the plurality of information pieces, the method including the steps of; discriminating whether the index information is recorded in the index information recording area or not, detecting an information piece recorded at most inner position in the index information recording area and transferring the optical pickup to a position of the information piece when it is discriminated that no index information is recorded in the index information recording area in the discriminating step; starting rotation of the optical disc, reading out and simultaneously reproducing the information piece by the optical pickup, and producing and storing a temporary index information from the read information; transferring the optical pickup to a position next to the information piece, reading out and simultaneously reproducing the information piece, and producing and storing temporary index information from the read information; and repeating the transferring step until the pickup is transferred to a last information piece in the information recording area.

According to the present invention, a partial R-CD can be reproduced by using the functions of the conventional CD player and slightly changing the algorism of the system controller, even in a case of using an apparatus whose optical pickup cannot be transferred to the position of the PMA area.

BRIEF DESCRIPTION OF THE DRAWINGS

FIGS. 4A to 4C are diagrams respectively showing information recording condition of a virgin disc, a partial disc and a finalized disc.

FIG. 5 is a diagram showing an embodiment of the present invention.

FIG. 6 is a flow chart showing an operation of tile present invention.

FIG. 7 is another flow chart showing an operation of the present invention.

DESCRIPTION OF THE PREFERRED EMBODIMENT

1st Embodiment

Figure 1:
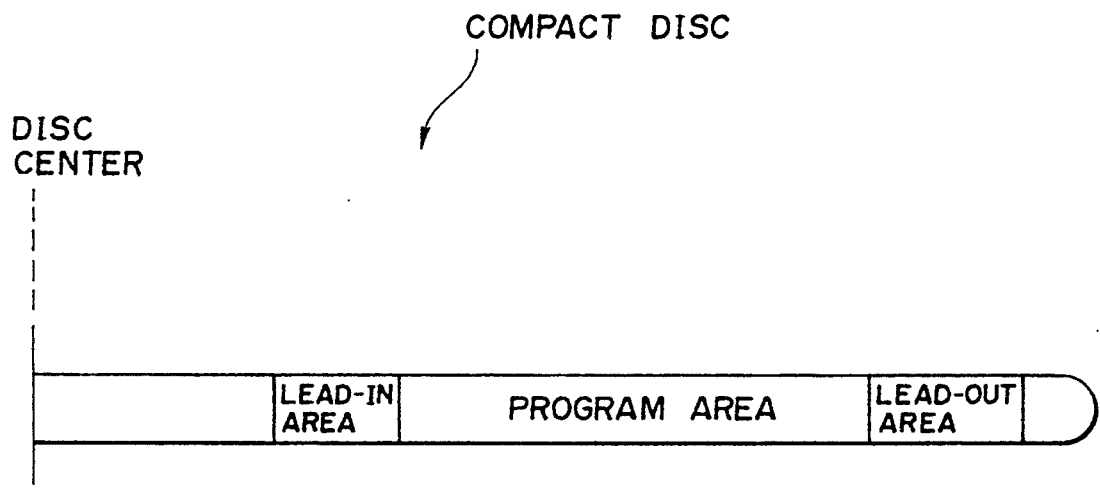
FIG. 1 is a diagram showing a recording format of a CD.
Figure 2:
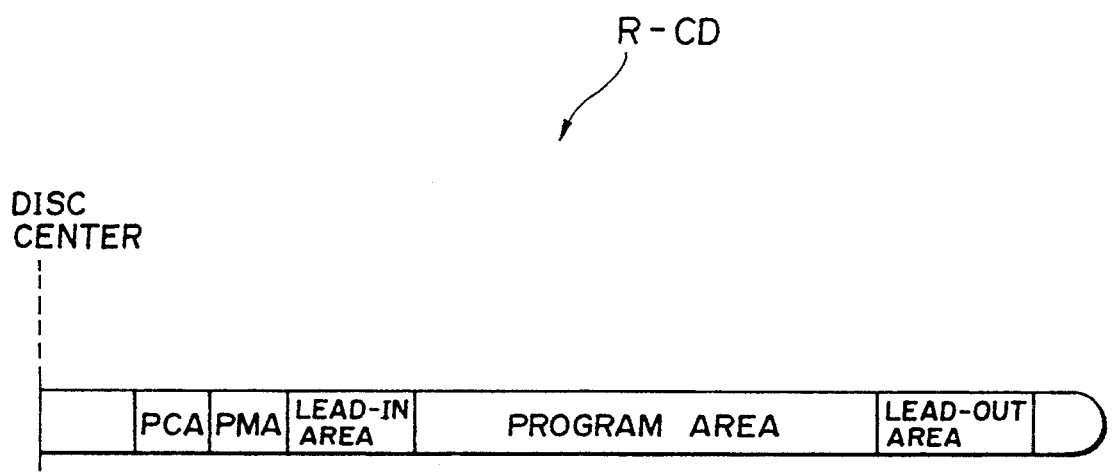
FIG. 2 is a diagram showing a recording format of an R-CD.
Figure 3:
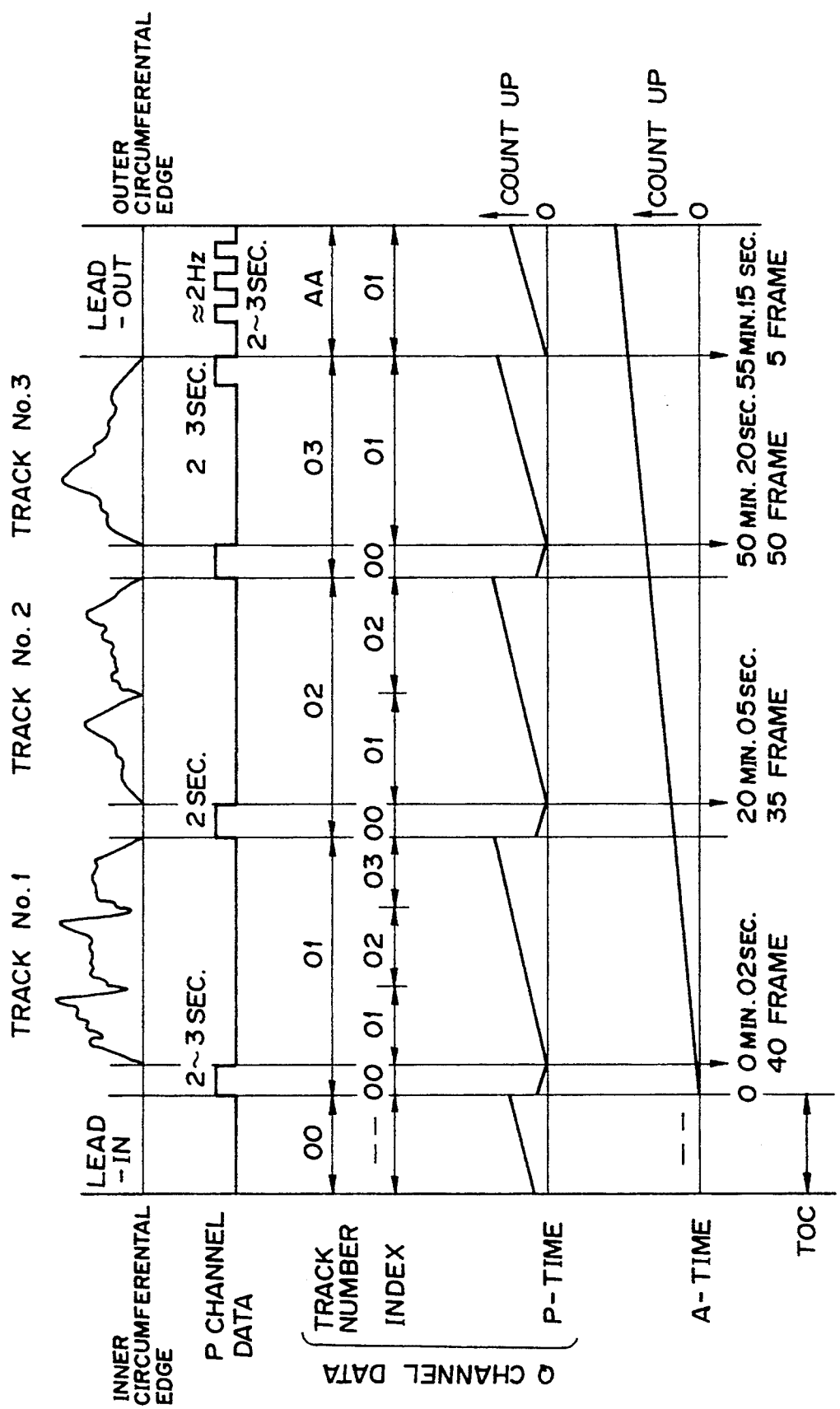
FIG. 3 is a diagram showing a recording format of a program area of the R-CD.

FIG. 5 shows a configuration of an optical disc reproducing apparatus according to the first embodiment of the present invention. As shown in FIG. 5, the apparatus includes an optical pickup 2, a sled (sliding) mechanism serving as a transferring means, a reproducing amplifier 4, a peak hold circuit P, an EFM demodulator 5, servo circuits 7 and 14, a low-pass filter (LPF) 8, a spindle motor 9 serving as a rotating means, a system controller 10, an oscillator 11, and switches SW1 to SW5. The system controller 10, the servo circuits 7 and 14, the peak-hold circuit P, the LPF 8 and the switches SW1 to SW5 constitutes a control means.

This optical disc reproducing apparatus is available for reproducing both conventional CDs and R-CDs. First, a reproducing operation of a conventional CD will be described below.

Information recorded on an optical disc 1 is read out by a reading body 21 of the optical pickup 2. On the optical pickup 2, an object lens 22 for converging a laser beam onto the disc 1 is provided. The object lens 22 supported by an actuator 23 in a fashion of being movable in both an optical axis direction and radial direction of the disc 1. The optical pickup 2 itself can be transferred in the radial direction of the disc by the sled mechanism 3.

A signal read by the optical pickup 2 (read RF signal) is fed to the EFM demodulator 5 through the reproducing amplifier 4, and is also AC coupled by a coupling capacitor C1. The AC coupled signal thus obtained is further fed to a peak hold circuit P, including a diode D1 and a capacitor C2, which outputs a voltage corresponding to the RF signal level. The outputted voltage is supplied to one input terminal of a comparator 6. The comparator 6 is supplied with a reference voltage of a predetermined threshold level at the other input terminal. As a result, the comparator 6 outputs an RF detection signal $DR_F$ of Hi(H) or Low(L) level which indicates whether or not an RF signal is included in the read RF signal.

Further, a focus error signal FE and a tracking error signal TE are generated from the servo circuit 7. These respective error signals FE and TE are fed to the focus actuator and the tracking actuator through switches SW1 and SW2 to constitute a focus servo loop and a tracking servo loop, respectively. The low frequency band component of the tracking error signal TE is extracted at a low pass filter 8 to generate a sled error signal SLE for moving the optical pickup 2 along the sled mechanism 3. The sled error signal SLE is fed to the sled mechanism 3 through a switch SW3 to constitute a sled servo loop. Further, in the servo circuit 14, a phase difference between a reproducing clock extracted from the reproduced EFM signal and a reference clock is detected to produce a spindle error signal SPE. The spindle error signal SPE is fed to the spindle motor 9 through the switch SW4. Such a reproducing clock is generated at a PLL (Phase Locked Loop) circuit (not shown) provided within the servo circuit 14, and a PLL lock detection signal $D_{PL}$ indicating the lock state of the PLL circuit is fed to the controller 10. Switching of these switches SW1 to SW4 is controlled by switching signals from the controller 10.

These respective switches not only allows the servo loops to be merely turned ON/OFF, but also are connected to drive signal sources to forcibly drive sections which are driven and controlled by the servo loops. For example, in order to allow the actuator 23 to jump in the radial direction of the disc in the tracking servo loop, a FWD (forward) voltage and a REV (reverse) voltage each having a polarity corresponding to each direction are supplied to the movable contact of the switch SW2. In order to move the optical pickup 3 at a high speed in the radial direction of the disc by the sled servo, a FWD voltage and a REV voltage each having a polarity corresponding to that direction are supplied to the movable contact of the switch SW3. In addition, a FWD voltage and a REV voltage for accelerating or decelerating the spindle motor 9 in the spindle serve. loop are supplied to the movable contact of the switch SW4. It is to be noted that DC levels generated from the respective drive signal sources are varied by the controller 10. For example, when the D.C. levels of the FWD signal and the REV signal supplied to the sled mechanism 3 are varied, the moving speed of the optical pickup 2 can be changed.

In such a configuration, when the disc 1 is loaded by a disc loading mechanism (not shown), the optical pickup 2 first moved to be located in the lead-in area of the disc to carry out a pull-in operation of the focus servo. If the focus servo is pulled-in (locked), then the spindle motor 9 is accelerated to rotate the disc 1. At the same time, pull-in operations of the tracking servo and the spindle servo are carried out. It is discriminated by detecting the PLL lock detection signal generated from the servo circuit 14 That the spindle servo is locked. If the spindle servo and the tracking servo are both locked, then TOC information recorded in the lead-in area is stored into a memory 12, and the reproduction of the recorded information is started.

Next, a reproducing operation of a partially recorded R-CD (partial disc) will be described below with reference to FIGS. 6 and 7. First, as shown in FIG. 6, the optical pickup 2 is transferred to a position corresponding to the lead-in area of the disc 1 by means of the sled mechanism while the rotation of the spindle motor 9 is stopped (step S1). The lead-in area is formed at position within a range of 23 to 25 mm from the disc center, in a concentric circle manner. Therefore, the above operation can be performed by transferring the optical pickup 2, by the sled mechanism to the disc center direction until a sensor provided at position corresponding to the lead-in area detects the arrival of the optical pickup 2. Next, the switch SW1 is changed-over to close the focus servo loop, and whether the focus servo is pulled-in (locked) or not is detected (step S2). The pull-in operation is repeated for a predetermined times, and if the servo is not pulled-in after the trials for the predetermined times, it is judged that no disc exists (step S3). When the focus servo loop is locked, the switch SW5 is closed (turned ON) while the spindle motor 9 is still kept being stopped (step S4). The switch SW5 is controlled by the system controller 10. When the switch SW5 is turned ON, the output signal of the oscillator 11 is inputted into the tracking servo loop. The oscillator oscillates at an unit frequency. Accordingly, since the outputted oscillating signal is delivered to the actuator of the optical pickup 2, the actuator 23 swings in the radial direction of the disc 1 at a frequency of the oscillating signal. By controlling the amplitudes of the oscillation signal to be an appropriate level, an information reading beam of the optical pickup 2 is driven so as to repeatedly traverse a plurality of tracks on the disc 1 in the radial direction. As the drive range of the tracking actuator is several hundreds μm, when the track pitch is 1.6 μm, the information reading beam traverses 100 tracks or more in a manner of moving back and forth in the radial direction of the disc.

Next, an explanation will now be given in connection with a waveform of a read RF signal reproduced by the optical pickup 2, in the case of reproducing a partially recorded R-CD, with reference to FIG. 8. When the actuator swings in the radial direction at an unrecorded area to allow the information reading beam to traverse a plurality of tracks, there appears a change in the intensity of the read RF signal corresponding to the existence of guide grooves formed on the R-CD disc (time periods of t2 to t3 and t4 to t5). Such a change in the intensity is called a radial contrast (contrast in the radial direction of the disc). While the amplitude of the radial contrast is determined in correspondence with the depth of the guide grooves, the wavelength of the laser beam, and the track pitch, it is generally at an extremely small level. Since the level of the outputted signal from the peak-hold circuit P becomes extremely low, the comparator 6 outputs a signal of "L" level as an RF detection signal. On the other hand, when the actuator swings in the radial direction of the disc at a recorded area, there takes place bright and dark portions (contrast in a light quantity) in a reflected beam produced by the phenomenon that the information reading beam is diffracted by pits formed at traversed tracks (time period of t3 to t4). In an ordinary reproduction, a read RF signal can be obtained by utilizing the principle that the information reading beam is diffracted by pits existing in a tangential direction of the track, and accordingly there takes place bright and dark portions in a reflected beam. However, when the information reading beam moves in a radial direction of the disc in the recorded area, there similarly takes place bright and dark portions in a reflected light beam (contrast in a light quantity), because pits exist at tracks traversed, although the frequency band of the bright and dark portions differs from the frequency in the case where the beam moves in a tangential direction. Since the bright and dark portions appear as the amplitude of the read RF signal, the output level of the peak hold circuit P becomes large. As a result, the comparator 6 outputs an RF detection signal of "H" level.

Figure 8:
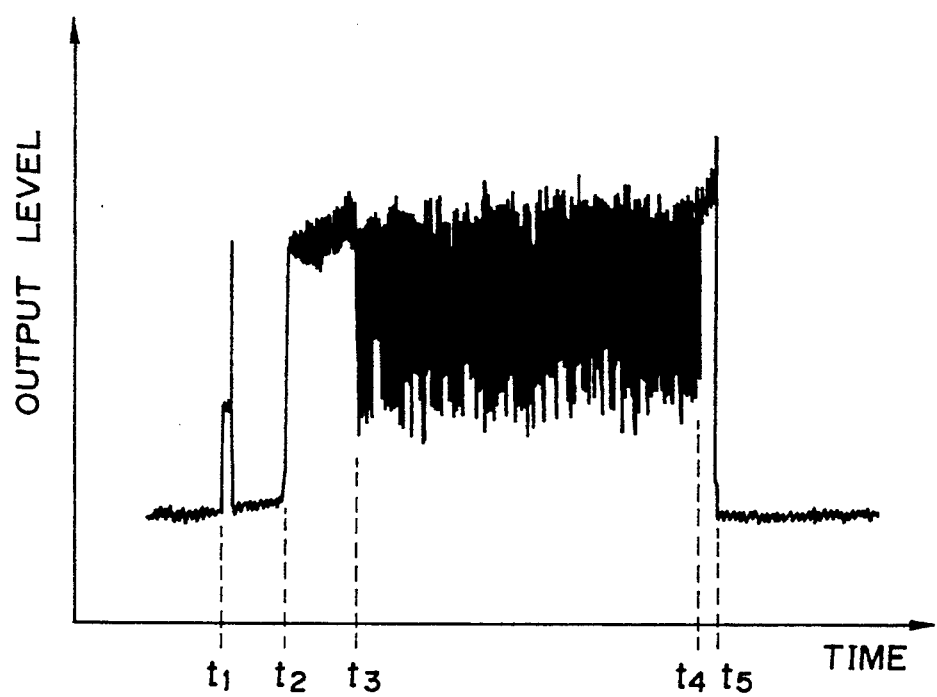
FIG. 8 is a diagram showing a waveform of an RF signal in FIG. 5.

At the time t1 in FIG. 8, pull-in operation of the focus servo is carried out. From the time t2, the sled servo control is performed in a FWD direction (radial direction) while the actuator being swinging. The wave form at the time period from t2 to t3 indicates an RF signal obtained in the lead-in area of the disc. During this time period, since no information is recorded in the lead-in area of the partially recorded R-CD, a waveform of a very small amplitude (the radial contrast) is obtained. When tile optical pickup enters the program area on which information is recorded at time t3, the amplitude of the RF signal becomes large in correspondence with the brightness and darkness of the reflected beam due to the diffraction phenomenon by pits of respective tracks. When the optical pickup reaches the unrecorded area at time t4, the waveform of a very small amplitude (the radial contrast) is obtained for a second time, The swing of the actuator is stopped at the time t5.

Since the RF signal is AC-coupled by the capacitor C1 in a manner that its D.C. component is eliminated, the peak hold circuit P holds a peak value from the center value of the amplitude of the RF signal. This held voltage is compared with a predetermined threshold level Vth in the comparator 6. Thus, detection of the RF signal is carried out (step S5).

In this way, by detecting the level of the RF detection signal $D_{RF}$ obtained in the lead-in area, discrimination of whether an object disc is a compact disc, a partial disc or a finalized disc is conducted.

If the RF detection signal is at the "H" level, the disc is judged to be a CD or a finalized disc. Accordingly, TOC information thereof is read out, and reproduction of the information recorded on the program area is started (step S6).

If the RF detection signal $D_{RF}$ is at "L" level, the operation proceeds to an pickup transfer routine (step shown in FIG. 7. In the pickup transfer routine, first, it is discriminated that the optical pickup 2 can be transferred to still outer circumferential direction from the position of the lead-in area (step S21). Such a discrimination is performed by detecting an outer limit position of the pickup movement using a device similar to the above described sensor. If the optical pickup is no longer transferable to the outer circumferential direction, the disc is ejected (step S22). On the other hand, if the optical pickup is transferable to still outer circumferential direction, the pickup is transferred to outer direction (direction to the program area) at a low transfer speed by the sled mechanism (step S23).

During this transfer operation, the spindle motor 9 is kept being stopped. Simultaneously, in the similar operation to the step S4, the switch SW5 is turned ON (step S24) and and RF signal detection is carried out (step S25). The RF signal detection is continuously performed while the pickup 2 is transferred, at low transfer speed, to the program area. If no RF detection signal is obtained until the pickup 2 reached the outer limit position of the pickup movement, the disc is judged as a virgin disc and ejected from the apparatus (step S22).

If the RF signal is obtained in step S25, it signifies that the pickup 2 has entered into the program area. However, on the program area, a plurality of information tracks (information pieces which is generally music pieces) are recorded, and it is necessary to find out a position of an end track because if the pickup suddenly enters into the unrecorded area (outer area of the end track) in the successive movement, the spindle motor 9 may possibly run out of servo control. In a case of reproduction of the conventional CD, the spindle motor is servo-controlled to be rotated at constant linear velocity (CLV) with reference to the EFM signal, however, the servo control operation in area where no EFM signal is recorded possibly causes an irregular rotation of the spindle motor.

For this reason, the pickup 2 is transferred to still outer circumferential side at low speed (step S26). During this pickup movement, the switch SW5 is turned ON (step S27) and the RF signal detection is continuously performed (step S28) while the spindle motor still kept being stopped. In the repeated operation of steps S26 to S28, if the RF signal is detected, that means the pickup 2 is still in the program area. While if the RF signal becomes absent, that means the pickup enters into the outer area of the program area. If the RF signal becomes absent (step S28), the position is assumed to be within about 10 tracks from the outer end of the program area, the pickup is transferred back to inner direction for a predetermined track number (e.g. 30 tracks) so as to be positioned in the area of the end track of the program area.

Then, the spindle motor 9 is rotationally driven under the CLV servo control and the switch SW2 is turned ON (step S9). Then, information of the end track (last track) is read out, the Q-data of sub-code data serving as a time (position) information is decoded from the read information, and the head (leading) address of the end track is calculated therefrom (step S9). Next, the pickup 2 is moved, by the sled mechanism 3, to the head position of the end track according to the calculated head address (step S11), and the Q-data of the sub-code data of the head position is read out. The Q-data is decoded and stored into the memory 12 provided in the controller 10 as a temporary index information (hereinafter referred to as temporary TOC) (step S12).

The operation of steps S8 to S12 are repeated until the pickup 2 reaches a first track in the program area (i.e. the track number is 1) (step S13). Thereafter, since the temporary TOC for all tracks (music pieces) recorded in tile R-CD is obtained, a desired track (music piece) in the program area can be reproduced using the temporary TOC. Accordingly, the spindle motor is controlled by CLV servo operation, the tracking servo control is also started after the switch SW2 is switched to receive the tracking error signal, and then the reproduction is started (step S14).

As described above, according to the first embodiment of the present invention, a temporary index information (TOC information) is produced and stored, even in a case of using an apparatus whose optical pickup can not be transferred to the PMA area. Accordingly, desired information can be reproduced from the program area of a partial disc. In step S7 of the first embodiment, the pickup 2 may be transferred while being rotated under the CLV servo control. In such a case, however, the rotation of the spindle motor should be stopped before the disc is ejected in step S22, in order avoid the irregular rotation of the spindle motor 3.

2nd Embodiment

Figure 9:
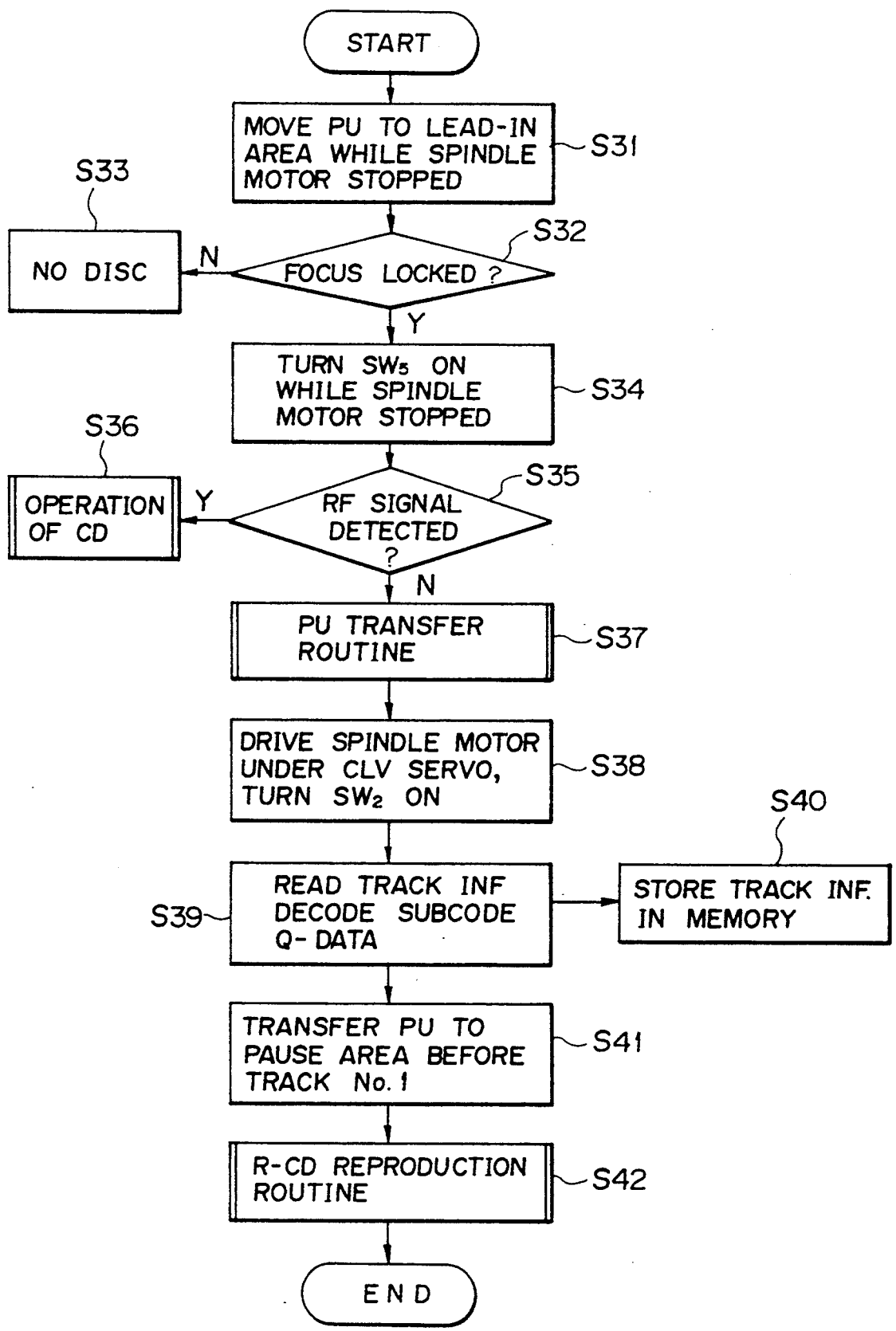
FIGS. 9 to 11 are still other flow charts showing operations of the present invention.

FIG. 9 shows reproduction operation of the information reproducing apparatus according to the second embodiment the present invention. In the second embodiment, the apparatus has the same construction as the apparatus according to the first embodiment, which is shown in FIG. 5. In addition, as shown in FIG. 9, the operation of steps S31 to S36 is the same operation as that of the first embodiment, i.e. steps S1 to S6 in FIG. 6, accordingly, the explanation is omitted.

Figure 10:
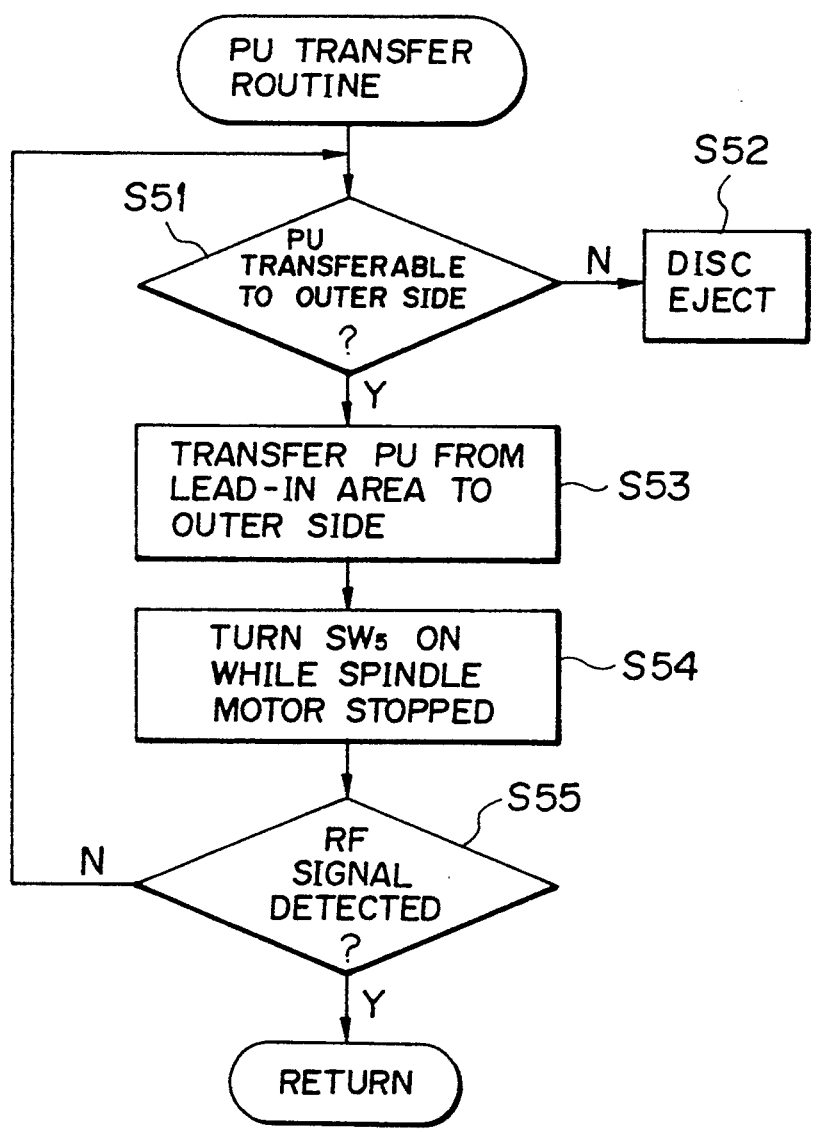

If the RF detection signal $D_{RF}$ is at "L" level in step 835, the operation proceeds to an pickup transfer routine (step S37), shown in FIG. 10. In the pickup transfer routine, first, it is discriminated that the optical pickup 2 can be transferred to still outer circumferential direction from the position of the lead-in area (step 551). Such a discrimination is performed by detecting an outer limit position of the pickup movement using a device similar to the above described sensor. If the optical pickup is longer transferable to the outer circumferential direction, the disc is ejected (step S52). On the other hand, if the optical pickup transferable to the outer circumferential direction, circumferential direction, the pickup transferred to outer direction (direction to the program area) at a low transfer speed by the sled mechanism (step S53). During this transfer operation, the spindle motor 9 is kept being stopped. Simultaneously, in the similar operation to the step S34, the switch SW5 is turned ON (step S54) and an signal detection is carried out (step S55). The RF signal detection is continuously performed while the pickup 2 transferred, at low transfer speed, to the program area. no RF detection signal is obtained until the pickup 2 reached the outer limit position of the pickup movement, the disc is judged as a virgin disc and ejected from the apparatus (step S52). The reason of transferring the spindle motor 2 while being stopped is as follows:

In the reproduction of the conventional CD, the spindle motor is controlled to be rotated at constant linear velocity by using the EFM signal, however, if the spindle motor is rotated at areas on which no EFM signal is recorded the spindle motor may possibly become out of servo control On the other hand, it is conceivable to transfer the while the spindle motor is controlled to be rotated at constant angular velocity (CAV). However, in such a case, if the disc is a virgin disc, the spindle motor should be once stopped before the disc is ejected from the apparatus in step S52, there resulting a requirement of a step for stopping the spindle motor.

If the RF signal is obtained in step S55, it shows that the pickup 2 has entered into the program area. Therefore, the operation returns to the main routine. Namely, the spindle motor 9 is rotationally driven under the CLV servo control, the switch SW2 is turned ON so as to perform the tracking servo control (step S38). Then, information recorded in the program area is read out and the Q-data of the sub-code data is decoded therefrom (step S39). The Q-data thus produced is stored in the memory 12 provided the controller 10 (step S40). Further, the pickup 2 transferred to a pause area positioned just before the first track (the track number 1) in accordance with tile stored Q-data (step S41).

Figure 11:
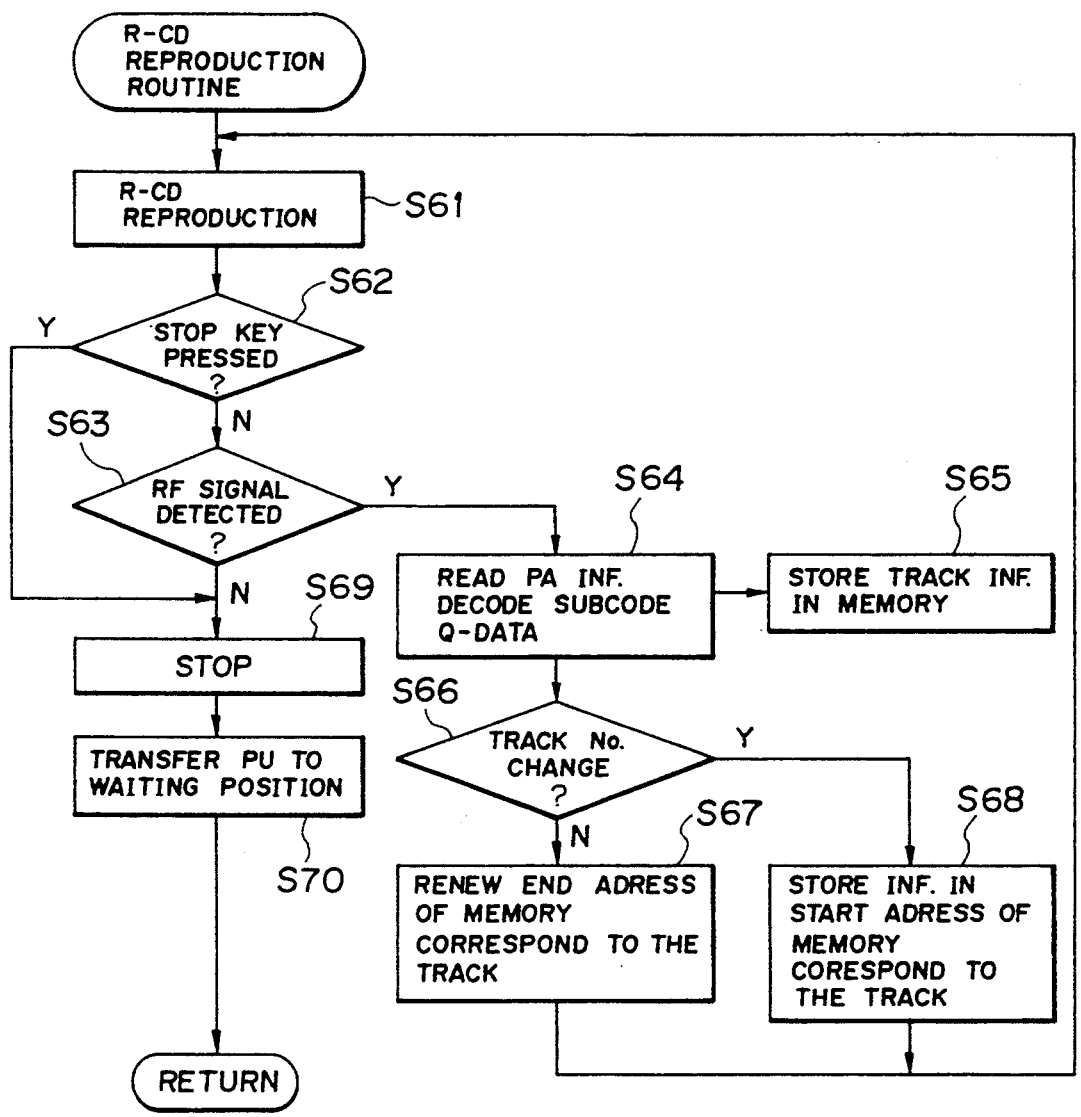

Next, the operation proceeds to the R-CD reproduction routine (step S42), shown in FIG. 11. In the R-CD reproduction routine, recorded information is successively reproduced from the first track (step S61). In this case, the search operation for a desired information piece cannot be performed because the temporary TOC of all tracks is net obtained yet. Then, the discrimination of whether the stop key is pressed or not is conducted (step S62). If the stop key is not pressed, that means the reproduction should be continued, the RF signal detection is carried out (step S63). If the RF signal is obtained, that means information exists on the track, the information is read out and the Q-data is decorded therefrom (step S64). The Q-data thus obtained is stored in the memory 12 (step S65). When the Q-data of all tracks are obtained, they can be used as temporary TOC and accordingly the search operation is available at the next reproduction process. Next, it is discriminated that the track number is changed or not (step S66). If the track number is changed, information is stored in the memory table corresponding to the track number, from the start address thereof (step S68). On the other hand, the track number is not changed, the end address of the memory table corresponding to that track number is renewed and information is stored thereinto (step S67). Then, the operation returns to the step S61 to repeat the steps S61 S68. If the stop key is pressed in step S62 or if the RF signal is not obtained in step S63, the reproduction terminated and the spindle motor is stopped (step S69). Then, the pickup is transferred to the waiting position at inner circumferential end of the disc (step S70) and the operation is ended.

As described above, according to the second embodiment of the present invention, a partial R-CD can be reproduced, even in a case of using an apparatus whose optical pickup cannot be transferred to the position of tile PMA area by using the functions of the conventional CD player and slightly changing the algorism of the system controller.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for reproducing information from a recordable optical disc having an information recording area for recording a plurality of information and an index information with respect to said plurality of information pieces, said apparatus comprising:
    a driving means for rotationally driving said optical disc;
    a pickup for irradiating a light beam onto said optical disc so as to read information recorded on said optical disc;
    a transferring means for transferring said pickup means in a radial direction of said optical disc;
    a memory means for storing a temporary index information;
    a discriminating means for discriminating whether or not the index information is recorded in the index information recording area while the rotation of the optical disc is stopped; and
    a control means for controlling said driving means, said pickup means and said transferring means and for producing said temporary index information into said memory means on the basis of a read information read by said pickup means,
    wherein said control means products and stores said temporary index information into said memory means when it is discriminated that no index information is recorded in the index information recording area by the discriminating means.

2. An apparatus according to claim 1, further comprising an oscillation circuit, wherein said pickup means is transferred by said transferring means while being swung in the radial direction of the disc at the same frequency as a oscillation frequency of the oscillation circuit.

3. An apparatus according to claim 1, wherein said control means produces the temporary index information for all of the plurality of information pieces recorded in the information recording area.

4. An apparatus according to claim 1, wherein said index information recording area is formed inner circumferential side of said information recording area.

5. A method of reproducing information, by irradiating a light beam emitted from an optical pickup, from a recordable optical disc having an information recording area for recording a plurality of information pieces and an index information recording area for recording index information with respect to said plurality of information pieces, said method comprising the steps of:
    discriminating whether or not the index information is recorded in the index information recording area while said optical disc is stopped;
    detecting an information piece recorded most outer position in the information recording area and transferring the optical pickup to a position of the information piece when it is discriminated that no index information is recorded in the index information recording area in said discriminating step;
    starting rotation of the optical disc, reading out the information piece by the optical pickup, and producing and storing a temporary index information from the read information;
    transferring the optical pickup to a position of next information piece positioned inside of the information piece in accordance with the stored temporary index information, reading out the information piece, and producing and storing temporary index information from the read information; and
    repeating said transferring step until temporary index information corresponding to all of the information pieces are produced and stored.

6. A method according to claim 5, further comprising sixth step of reproducing the information pieces in accordance with the stored index information.

7. A method according to claim 5, wherein said first step comprising the steps of:
    stopping rotation of the optical disc;
    moving the optical pickup to the index information recording area;
    detecting an RF signal from a read signal of the optical pickup while the optical pickup being swung in a radial direction of the disc at a predetermined frequency; and
    discriminating whether the index information is recorded in the index information recording area or not on the basis of the detected RF signal.

8. A method according to claim 5 comprising the step of moving said pickup inwardly to said index information recording area formed on an inner circumferential side of said information recording area.

9. A method of reproducing information, by irradiating a light beam emitted from an optical pickup, from a recordable optical disc having an information recording area for recording a plurality of information pieces and an index information recording area for recording index information with respect to said plurality of information pieces, said method comprising the steps of:
    discriminating whether or not the index information is recorded in the index information recording area while said optical disc is stopped;
    detecting an information piece recorded most outer position in the information recording area and transferring the optical pickup to a position of the information piece when it is discriminated that no index information is recorded in the index information recording area in said discriminating step;
    starting rotation of the optical disc, reading out and simultaneously reproducing the information piece by the optical pickup, and producing and storing a temporary index information from the read information;
    transferring the optical pickup to a position of next information piece, reading out and simultaneously reproducing the information piece and producing and storing temporary index information from the read information; and repeating said transferring step until the pickup is transferred to a last information piece in the information recording area.

10. A method according to claim 9, wherein said first step comprising the steps of:
stopping rotation of the optical disc;
moving the optical pickup to the index information recording area; while the optical pickup being swung at a predetermined frequency;
detecting an RF signal from a read signal of the optical pickup while the optical pickup being swung in a radial direction of the disc at a predetermined frequency; and
discriminating whether the index information is recorded in the index information recording area or not on the basis of the detected RF signal.

11. A method according to claim 9 comprising the step of moving said pickup inwardly to said index information recording area formed or an inner circumferential side of said information recording area.

* * * * *